(12) United States Patent  
Sandwith

(10) Patent No.: US 6,485,237 B1  
(45) Date of Patent: Nov. 26, 2002

(54) DOUBLE-DECK TRAILER

(76) Inventor: Richard B. Sandwith, c/o Propulsion Engineering, 3325 Meridian East, Edgewood, WA (US) 98371

( * ) Notice: Subject to any disclaimer, the term of this patent is extended or adjusted under 35 U.S.C. 154(b) by 0 days.

(21) Appl. No.: 09/870,981

(22) Filed: May 31, 2001

(51) Int. Cl.[7] ................................................. B60P 7/08
(52) U.S. Cl. ............................................ 410/24; 410/4
(58) Field of Search ................................ 410/4, 24, 26, 410/29.1; 414/495, 540, 537; 280/401; 187/215, 251, 252, 253; 105/370

(56) References Cited

U.S. PATENT DOCUMENTS

| | | | |
|---|---|---|---|
| 3,718,227 A | | 2/1973 | Swift |
| 4,701,086 A | * | 10/1987 | Thorndyke ................. 410/26 |
| 4,801,229 A | * | 1/1989 | Hanada et al. ............. 410/26 |
| 4,932,830 A | | 6/1990 | Woodburn |
| 5,730,578 A | * | 3/1998 | Smidler ..................... 410/4 X |
| 6,027,290 A | | 2/2000 | Andre ........................ 410/24 |

* cited by examiner

Primary Examiner—Stephen T. Gordon
(74) Attorney, Agent, or Firm—Keith D. Gehr

(57) ABSTRACT

A two level trailer is shown in which the upper deck may be conveniently tilted down to load or unload cargo. An upper deck is supported on four posts, one mounted at each corner of the lower deck. The front posts are fixed in place but the rear posts are pivotally mounted to the lower deck so as to have forward or rearward freedom of movement. The upper deck is pivotally mounted to the top ends of the front posts. Sleeves mounted on a cross member at the rear edge of the upper deck slide up and down the rear posts as the deck is raised or lowered. The cross member has some rotational freedom of movement relative to the upper deck to prevent binding with the rear posts when the upper deck is moved up or down.

9 Claims, 6 Drawing Sheets

DOUBLE-DECK TRAILER

The present invention is directed to a trailer having a fixed lower deck and an upper deck tiltable down for loading so that it can readily accommodate vehicles or other cargo on both levels.

BACKGROUND OF THE INVENTION

Trailers pulled by a hauling vehicle are ubiquitous on the nation's high-ways. These vary in size and configuration from the giants in excess of 50 feet in length used for overland cargo hauling to very light duty types used for hauling small recreational boats. They include low boy configurations for heavy equipment hauling, and flat bed types with no significant superstructure. Some have enclosed boxes while others are of open frame construction, such as auto transports. Most have a single level deck but auto transports and some livestock carriers normally have two levels to increase cargo capacity.

Recreational vehicles are now popular with the American public. These vary from small models having the bare essentials for comfortable camping to large luxury models having deluxe living accommodations. Many of these "RVs", as they are generally called, will also tow a smaller car or a boat for use at stopping points. A small car is far more convenient for local driving than the bus-sized RVs. Many owners would carry both a boat and small car if there was some way to do this but that has not been convenient since trailers that can accommodate both have not been readily available. Woodburn, in U.S. Pat. No. 4,932,830, shows one such double deck trailer. The upper deck is a boat cradle that slides up and down four corner posts and is elevated or lowered by a winch operated cable system. After the boat is loaded and raised an automobile can be driven on the platform below it. However, this arrangement is awkward since no provision is made for a boat trailer. The user is left to his own imagination how the boat can be loaded and unloaded and how it can be subsequently transported from trailer to the water and back.

Swift, in U.S. Pat. No. 3,718,227, shows a similar transport in which the boat trailer actually becomes the upper deck. The trailer and boat are backed onto a flat bed trailer. A pair of toggling arms and cross bar attached to a winch first lifts the rear of the trailer into position. Sequentially a second pair of arms located mid-trailer raises the front. A car may then be driven onto the deck underneath. The boat trailer requires some specific adaptations to be compatible with the system.

In U.S. Pat. No. 6,027,290, Andre shows a two level platform that may be installed on a truck bed, rail car, etc. An upper deck rides in six upright slotted posts and is raised or lowered parallel to a lower deck to accommodate one-above-the other Loads. An elevating system is operated by a hydraulic cylinder and cable arrangement. While these systems are fine for the environments they have been designed for, they lack convenience, simplicity, and safety required by the recreational user.

SUMMARY OF THE INVENTION

The present invention is a dual level trailer that is simple in construction and operation. The trailer is eminently suitable for the recreational or other user who wishes to carry more than one item that would conveniently fit on a relatively small flat bed or other type trailer. The construction is based on a conventional flat bed trailer of an appropriate size. This may have a single wheel pair, dual pair, or multiple axles depending on the anticipated load, and will have a conventional hitch at the forward end. The trailer will provide a lower deck for whatever load will be carried.

The trailer deck will normally have a conventional generally rectangular configuration or outline, although this is not absolutely essential. Upright posts to support the upper deck are mounted at each corner. The posts at the forward end of the trailer are fixed in position and appropriately braced. The two posts at the rearward end are pivotally attached at their lower ends so as to have at least some forward and rearward freedom of movement. The upper deck is pivotally attached to the upper ends of the forward posts so that the rearward end can be tilted or sloped down to the level of the lower deck in order to receive a load and then can be raised back to travelling position. There are a pair of sleeves, one mounted at each of the rear corners of the upper deck, that will slide up and down outside the two rear posts when the upper deck is raised or lowered. These must have some limited rotational freedom of movement relative to the upper deck in order to prevent binding during movement. An elevating means serves to raise or lower the upper deck.

The upper deck will have a frame with both longitudinal and lateral structural support members. A preferred construction will provide a tubular transverse means to support the rearward portion of the deck. This may be a single tube or a pair of spaced apart but axially aligned tubes. The sleeves sliding on the uprights will be welded to the ends of the tubular elements. The tubular support means will pass through any longitudinal support members but must have limited rotational freedom of movement relative to them.

A number of possible elevating devices may be used; e.g., hydraulic cylinders, or a cable and winch system for raising or lowering the upper deck. A preferred system is one similar to that shown in the aforenoted Andre patent. A long hydraulic cylinder is mounted at the forward end of the upper deck, preferably located on the underside. A pair of side-by-side cables are attached to the piston rod and extend rearward to a pair of side-by-side pulleys generally centrally located adjacent the rear edge of the upper deck. The pulleys direct the cables laterally left and right to the sleeves. There a second set of pulleys mounted in the sleeves again changes cable direction toward the upper ends of the rear upright posts. The cables are anchored in position at that point. As the piston of the hydraulic cylinder is extended the rear edge of the upper deck is lowered to or about to the point of contact with the lower deck. The opposite motion occurs when the piston is withdrawn back into its cylinder.

With the upper deck in lowered position a boat trailer, all terrain vehicle, or any similar load may be driven or winched into place. Suitable straps or other conventional means will be used for safe load retention while travelling. When the upper deck is raised with its load in place it is preferably latched in place for safe travel by the use of pins placed beneath it in the rear posts or by other suitable retention mechanisms.

It is an object of the present invention to provide a double deck trailer that is of simple construction, easy to load and unload, and with a high degree of safety for its load and operating personnel.

It is another object to provide a double deck trailer in which one end of the upper deck may be tilted down for loading and unloading.

It is a further object to provide such a trailer that has few moving parts so that wear during operation is minimized.

These and many other objects will become readily apparent to those skilled in the art upon reading the following detailed description taken in conjunction with the drawings.

DETAILED DESCRIPTION OF THE PREFERRED EMBODIMENTS

Figure 1:
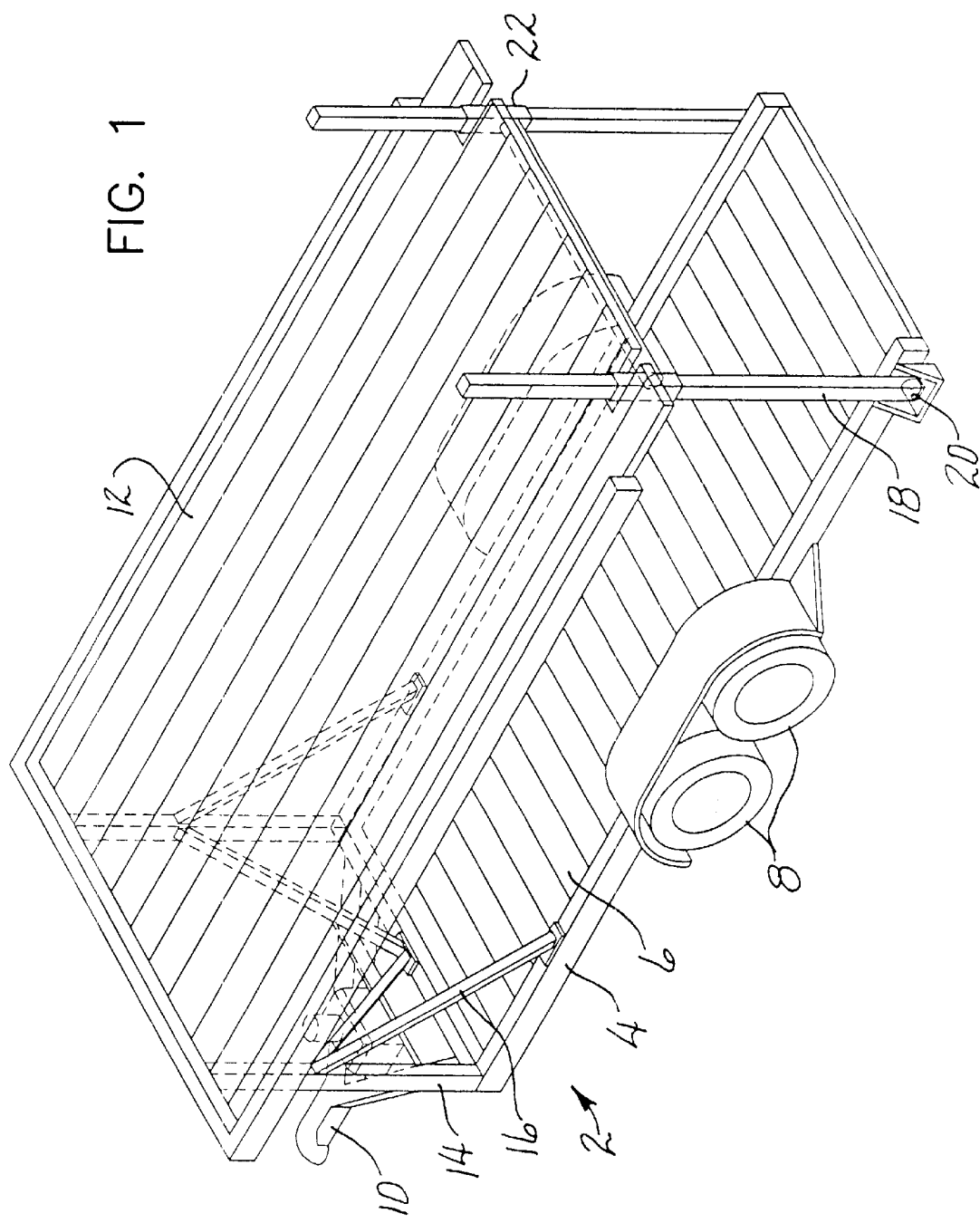
FIG. 1 is a perspective view of the trailer taken from the rear and and above with the upper deck in elevated position for travel.

The construction and operation of the double deck trailer of the present invention can now be readily understood by reference to the drawings. FIG. 1 is an overall view of the trailer. The upper deck is in raised position, as it would be for travelling. The basic trailer, generally shown at 2, has a framework 4, a lower deck 6, dual wheels 8 and a hitch 10. Upper deck 12 is supported on four posts attached at the corners of the lower deck. Front posts 14 are welded to frame 4 and supported by braces 16. Rear posts 18 are pivotally attached to framework 4 at their lower ends 20 so as to have limited fore and aft movement. During upward or downward motion of the upper deck, sleeves 22 slide on upright posts 18.

Figure 2:
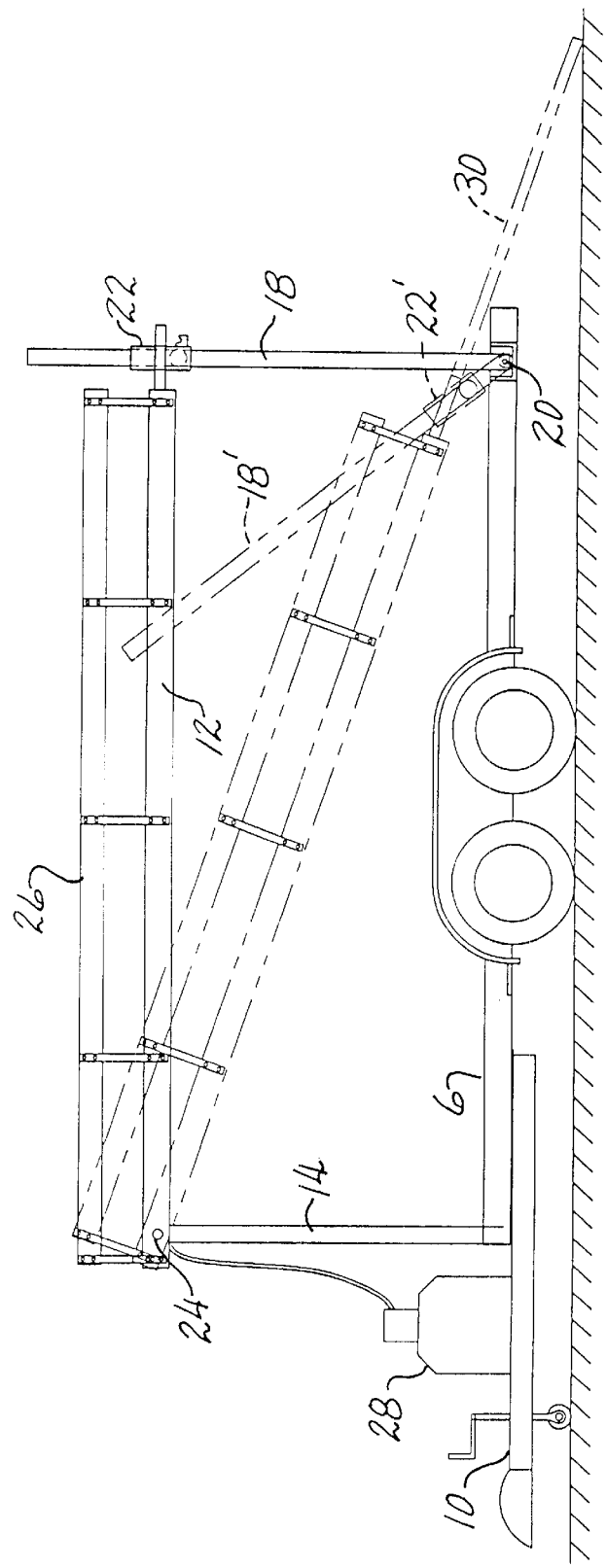
FIG. 2 is a side elevation showing the upper deck in both raised and lowered position.

FIG. 2 is a side elevation showing the upper deck in raised position for travel or, alternatively, in tilted position for loading. At its forward end the upper deck 12 is pivotally attached at 24 to the top of the forward posts 14. The position of rear posts 18 and sleeves 22 when the upper deck is lowered is shown at 18' and 22' respectively. The upper deck may alternatively have a safety railing 26. A hydraulic system 28, mounted here at the hitch end serves to activate the raising and lowering mechanism. Removable ramp 30, shown in phantom detail can be used to facilitate loading either the upper or lower decks.

Figure 3:
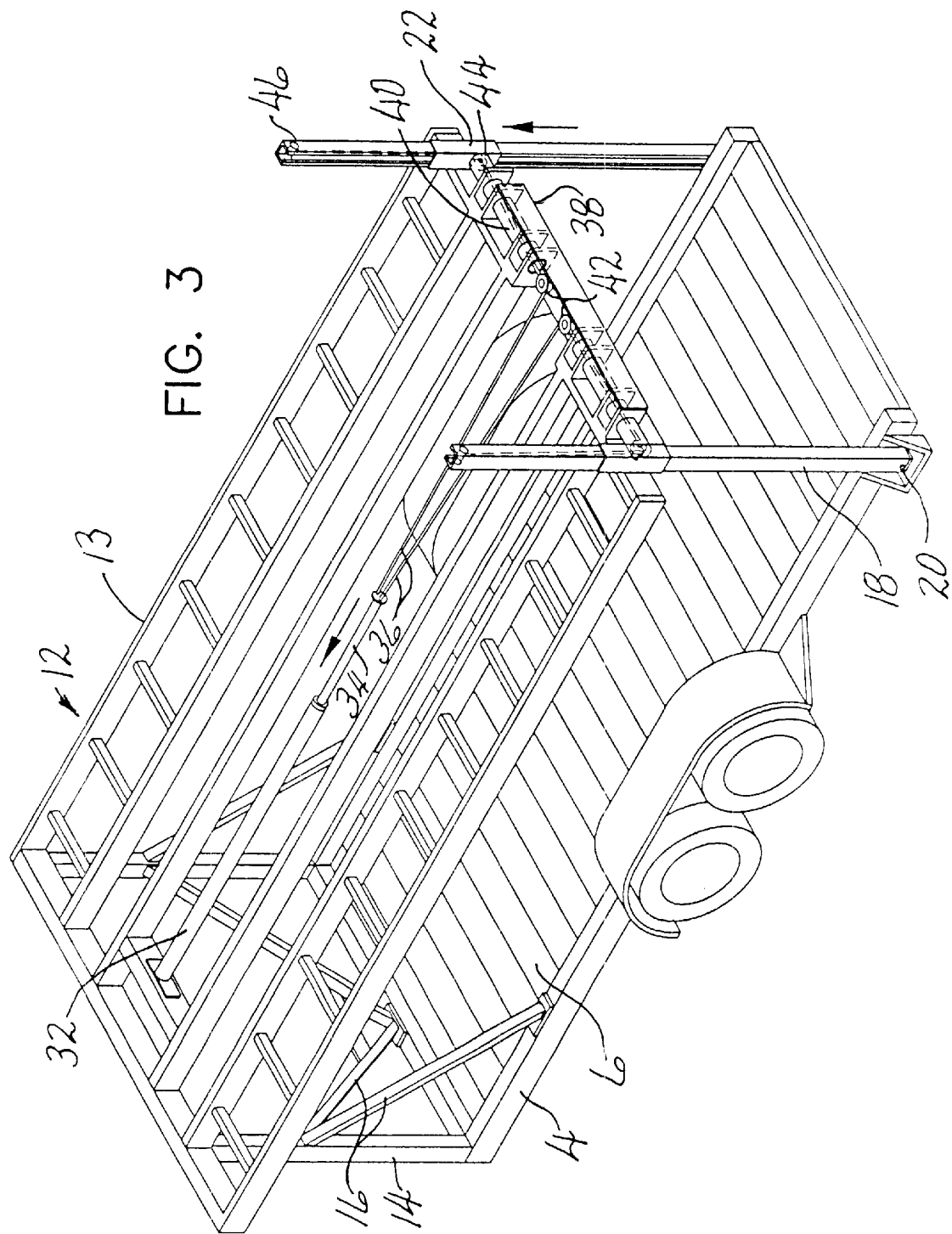
FIG. 3 is an additional perspective view taken from the rear and above with the decking of the upper deck removed to show the elevating mechanism.
Figure 4:
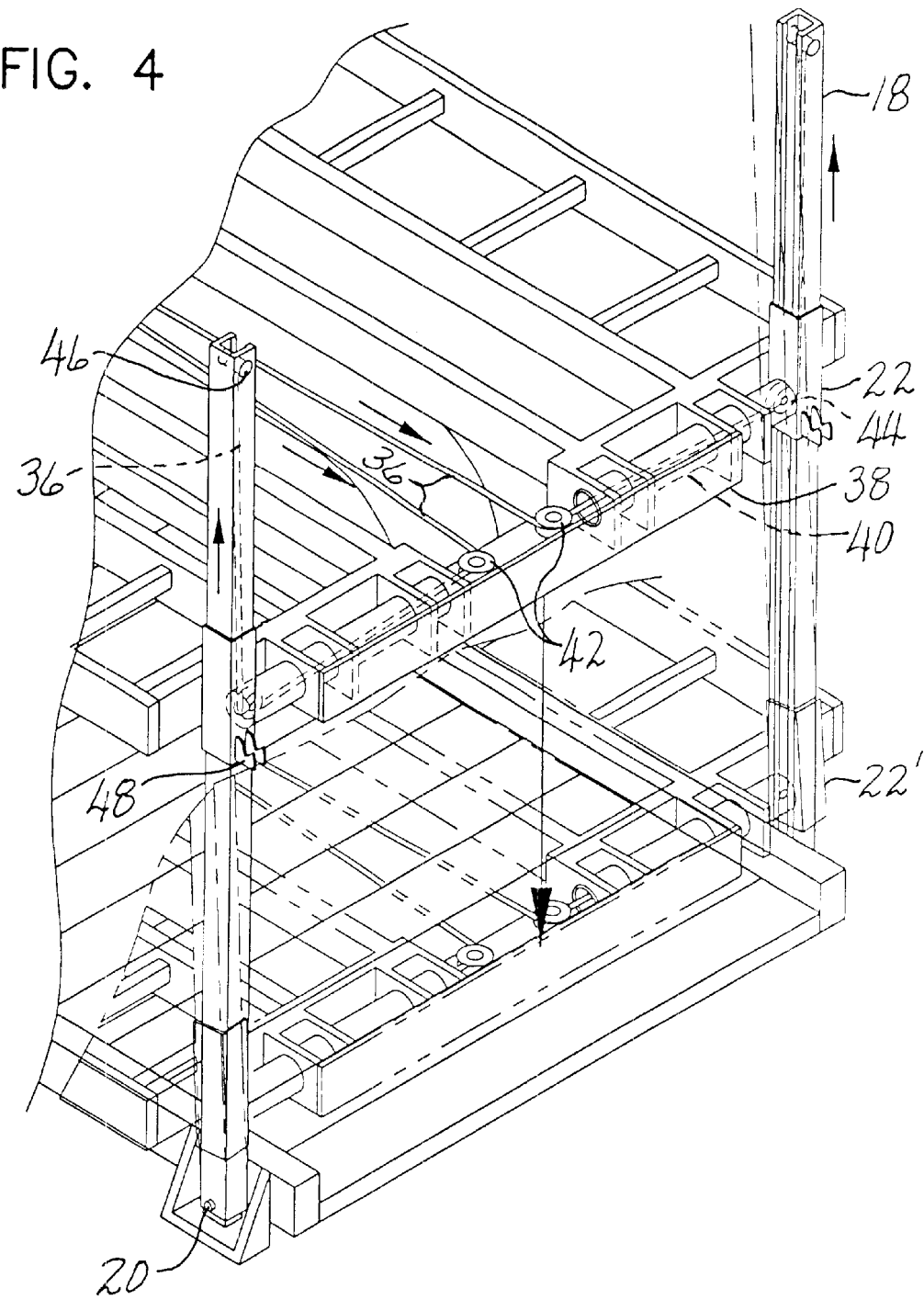
FIG. 4 is a detailed partial perspective illustration from the rear and above showing additional detail of the upper deck elevating mechanism with the read deck being shown in the down and partially raised positions.
Figure 5:
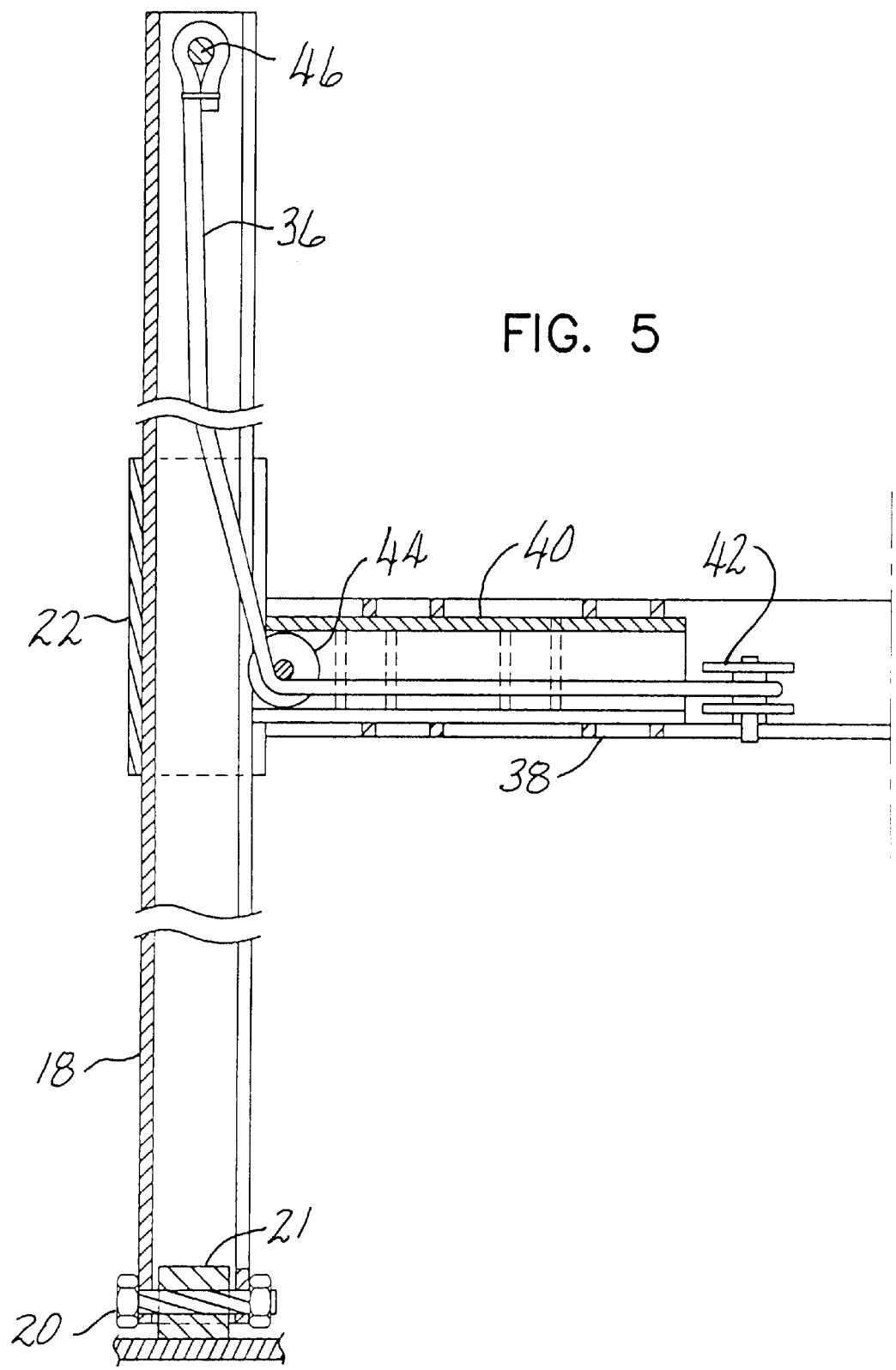
FIG. 5 is a cutaway partial rear elevation showing further detail of the upper deck elevating mechanism.

FIGS. 3–5 shows a preferred elevating mechanism for the upper deck. A long hydraulic cylinder 32 is attached at the forward end of the framing 13 for the upper deck. This would normally be located beneath the decking which has here been removed for clarity. The piston rod 34 of this cylinder has attached to it a pair of cables 36. These extend rearward to upper deck frame portion 38. Tubes 40, aligned along a common axis, pass through the outer portions of upper deck framing 38 and act to support the upper deck on the upright posts 18. There must be rotational freedom of movement between tubes 40 and frame portion 38 to prevent binding when the deck is raised or lowered. At their outer ends tubes 40 are welded to sleeves 22. While the construction shown with a gap between tubes 40 is preferred for convenience of construction and assembly, a single tube could also be used.

A pair of pulleys 42 are attached to frame portion 38 and change direction of cables 36 from rearward to transverse. Cables 36 pass through tubes 40 and at 44 a second pair of pulleys, mounted in sleeves 22, direct the cables upward within posts 18. The cables are attached at the upper ends of the posts at 46. This seen in clearer detail in FIG. 5. Rear posts 18 are pinned to studs 21 integral with the lower deck frame (FIG. 5). Again, it is essential that the upper deck frame member 38 and tubes 40 have limited freedom of rotational movement. It is tubes 40 that are attached to sleeves 22, not frame member 38.

Construction is simplified if tubes 40 are slotted on the lower side and if posts 18 are slotted on the side where they face inwardly. Cables 36 should preferably respectively be of left and right hand twist to avoid tangling.

When the piston 34 of hydraulic cylinder 32 is extended the upper deck is tilted downward. Alternatively, when the piston is withdrawn into the cylinder the deck is raised.

A suitable alternative construction for the construction shown in FIG. 5 would be to have short tubes mounted outside the frame in bearings that would accommodate the forces exerted upon them. Further, hydraulic cylinders acting between the upper and lower decks could be used for an elevating mechanism.

Figure 6:
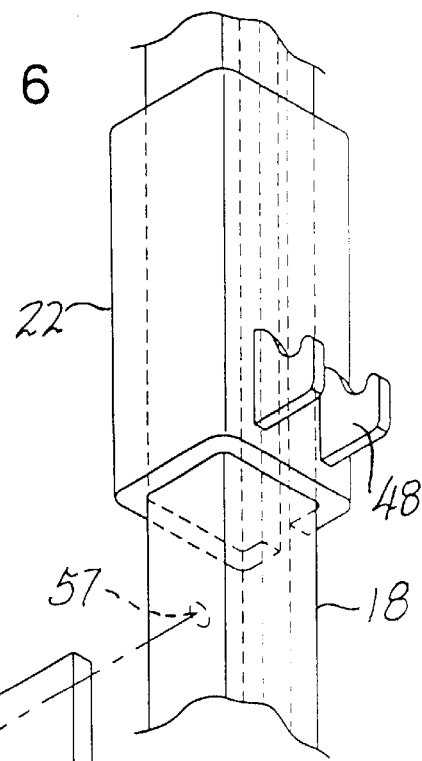
FIGS. 6 and 7 illustrate one mechanism for latching the upper deck in position for travel.
Figure 7:
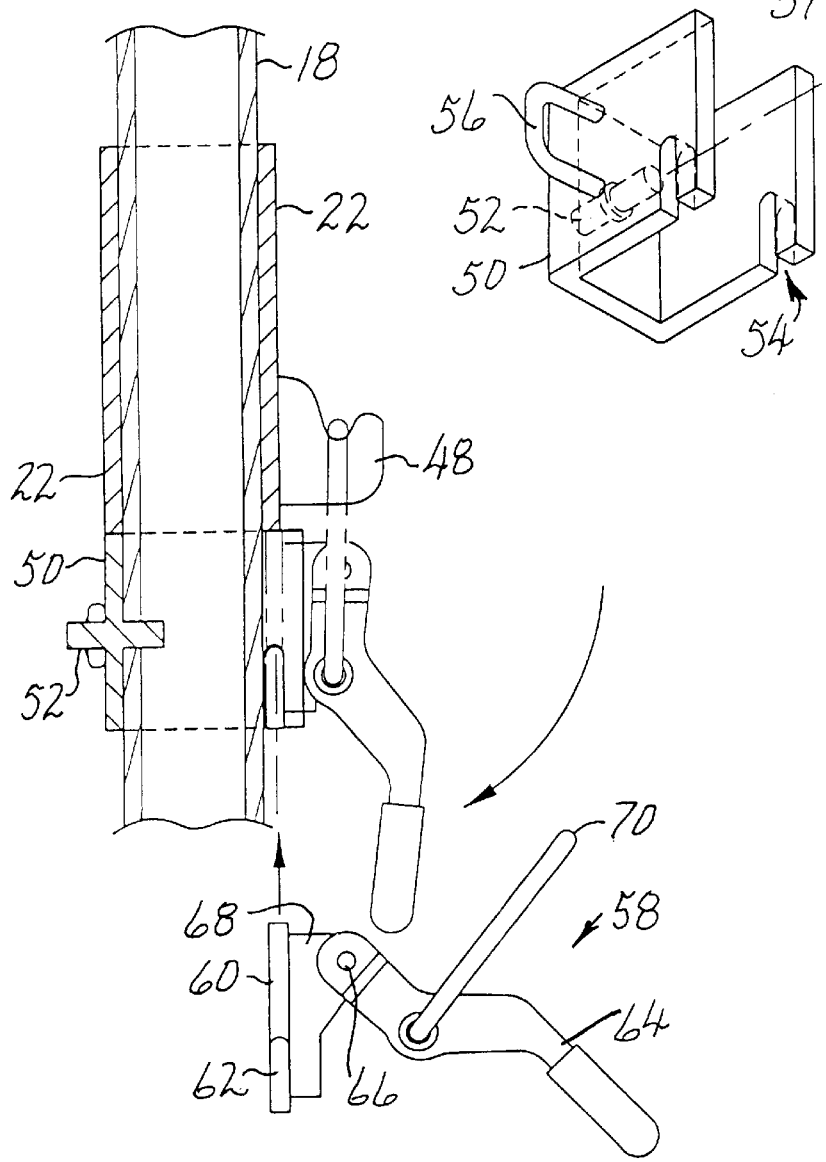

When travelling, the upper deck, if raised, should for safety be held in position by pins, bolts, or some other mechanism associated with rear posts 18 that would prevent any possible downward movement. A preferred mechanism is shown in FIGS. 6 and 7. In FIG. 6 is seen, looking from somewhat beneath, a U-shaped bracket 50 having a fixed pin 52, and slots 54. An alternative loop 56 may be provided as an anchoring point for strapping. Pin 52 is sized to pass through hole 57 in post 18. This hole is drilled in the portion of the post that faces the forward end of the trailer. The U-shaped bracket closely embraces post 18 with the ends of the bracket and slots 54 extending somewhat beyond the post. A toggling/locking mechanism 58 is seen in FIG. 7. This has a back plate 60 with sideways extending tabs 62, and a handle 64 pivotally attached at 66 to a rib 68. A U-shaped loop 70, free to move within the handle, acts to lock the mechanism 58 to extending ears 48 when it is slid upwardly into slots 54 of the U-shaped bracket 50. Simple downward movement of handle 64 toggles the entire locking mechanism in place. This is installed with the upper deck raised slightly. The deck is then lowered onto the locking device and securely retained.

It will be apparent to those skilled in the art that many minor construction changes could be made that have not been described herein but would not alter the general concept and working principle of the two level trailer. It is the intention of the inventor that these should be included within the scope of the invention if encompassed within the following appended claims.

I claim:

1. A dual level trailer having a fixed position lower deck and a tiltable upper deck that comprises:

the lower deck being of generally rectangular outline having forward and rearward ends, the forward end being adjacent a hitch;

upright posts located at each corner of the lower deck to support the upper deck, the pair of posts located at the forward end of the lower deck being fixed in position, the pair of posts located at the rear end of the lower deck being pivotally attached to the lower deck so as to have limited forward and rearward freedom of movement;

the forward end of the upper deck being pivotally attached to the upper ends of the forward posts to enable the upper deck to tilt down for cargo loading or be raised to travel position;

post enclosing sleeves attached at rear corners of the upper deck, the sleeves being slidable up or down the rear posts, the sleeves having limited rotation relative to the upper deck sufficient to prevent binding when the upper deck is moved relative to the rear posts; and elevating means to raise and lower the upper deck.

2. The trailer of claim 1 in which the elevating means comprises a hydraulic cylinder mounted at the forward end of and below the upper deck, the cylinder having an elongated piston acting toward the rear portion of the upper deck;

a pair of side-by side cables attached to and extending rearward from the piston of the cylinder;

a first pair of pulleys generally centrally located and adjacent the rear edge of the upper deck to direct the cables laterally to the outer edges of the upper deck;

a second pair of pulleys associated with the sleeves further directing the cables to the upper end of the rear posts at which point the cable ends are fixed, so that when the piston is extended the upper deck is allowed to tilt downward for loading or unloading and when the piston is withdrawn into the cylinder the deck is raised to travel position.

3. The trailer of claim 1 further having a latch means associated with the rear posts to safely secure the upper deck when in raised position.

4. A dual level trailer having a lower fixed position deck and a tiltable upper deck that comprises:

the lower deck being of generally rectangular outline having forward and rearward ends, the forward end being adjacent a hitch;

upright posts located at each corner of the lower deck to support the upper deck, the pair of posts located at the forward end of the lower deck being fixed in position, the pair of posts located at the rear end of the lower deck being pivotally attached to the lower deck so as to have forward and rearward freedom of movement;

the upper deck having longitudinal and transverse structural support members, the forward end of the upper deck having a support member pivotally attached to the upper ends of the forward posts to enable the upper deck to tilt down for cargo loading or be raised to travel position;

a tube means providing structural support passing transversely through the rearward portion of the longitudinal upper deck structural support members, said tube means and support members having relative rotational freedom;

post enclosing sleeves attached to outboard ends of the tube means, the sleeves positioned to slide up and down over the rear posts, and elevating means to raise and lower the upper deck.

5. The trailer of claim 4 in which the elevating means comprises a hydraulic cylinder mounted at the forward end of and below the upper deck, the cylinder having an elongated piston acting toward the rear portion of the upper deck;

a pair of side-by-side cables attached to and extending rearward from the piston of the cylinder;

a first pair of pulleys generally centrally located and adjacent the rear edge of the upper deck to direct the cables laterally to the outer edges the upper deck;

a second pair of pulleys located in outboard ends of the terse tube means adjacent the sleeves further directing the cables to the upper end of the rear posts at which point the cable ends are fixed, so that when the piston is extended the upper deck is allowed to tilt downward and when the piston is withdrawn into the cylinder the deck is raised to travel position.

6. The trailer of claim 5 in which the rear posts and the tube means are slotted.

7. The trailer of claim 6 in which the cables are located inside the tube means and the rear posts.

8. The trailer of claim 5 in which the tube means comprises a pair of separated tubes lying along a common longitudinal axis.

9. The trailer of claim 5 further having a latch means associated with the rear posts to safely secure the upper deck when in raised position.

* * * * *